United States Patent
Lee et al.

(10) Patent No.: US 10,753,268 B2
(45) Date of Patent: *Aug. 25, 2020

(54) INTERCOOLER COOLING APPARATUS AND METHOD FOR CONTROLLING TRANSMISSION FLUID AND AIR CONDITIONER REFRIGERANT TEMPERATURE

(71) Applicants: Hyundai Motor Company, Seoul (KR); Kia Motors Corporation, Seoul (KR)

(72) Inventors: Min-Young Lee, Seoul (KR); Il-Suk Yang, Gyeonggi-do (KR); Dang-Hee Park, Seoul (KR); Jung-Hyeok Lim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 328 days.

This patent is subject to a terminal disclaimer.

(21) Appl. No.: 15/836,435

(22) Filed: Dec. 8, 2017

(65) Prior Publication Data
US 2019/0078501 A1    Mar. 14, 2019

(30) Foreign Application Priority Data
Sep. 11, 2017  (KR) .................. 10-2017-0115937

(51) Int. Cl.
*F02B 29/04*   (2006.01)
*F02M 26/27*   (2016.01)
*F02M 26/31*   (2016.01)

(52) U.S. Cl.
CPC ......... *F02B 29/0443* (2013.01); *F02M 26/27* (2016.02); *F02M 26/31* (2016.02); *F01P 2060/02* (2013.01); *F01P 2060/045* (2013.01); *F01P 2060/08* (2013.01); *F01P 2060/12* (2013.01)

(58) Field of Classification Search
CPC .... F02B 29/0443; F02M 26/27; F02M 26/31; F01P 2060/02; F01P 2060/12; F01P 2060/045; F01P 2060/08
USPC .......................................................... 60/599
See application file for complete search history.

(56) References Cited

U.S. PATENT DOCUMENTS

| 6,386,273 B1 | 5/2002 | Hateley |
| 9,016,355 B2 | 4/2015 | Hirai |

FOREIGN PATENT DOCUMENTS

| JP | H11-192833 A | 7/1999 |
| JP | H11-223477 A | 8/1999 |
| KR | 2010-0041102 A | 4/2010 |
| KR | 2016-0009409 A | 1/2016 |

(Continued)

*Primary Examiner* — Laert Dounis
*Assistant Examiner* — Edward Bushard
(74) *Attorney, Agent, or Firm* — Mintz Levin Cohn Ferris Glovsky and Popeo, P.C.; Peter F. Corless

(57) ABSTRACT

An intercooler cooling apparatus is provided. The apparatus cools an intercooler installed between a compressor of a turbocharger and an engine to adjust an oil temperature. The apparatus includes a water tank that surrounds a part of an outer side of the intercooler, in which cooling water discharged from the engine flows into a first side to exchange heat with the intercooler and the cooling water is discharged through a second side. An ATF warmer and an air conditioner refrigerant line are also installed in the water tank, in which oil of a transmission is circulated.

19 Claims, 4 Drawing Sheets

(56) References Cited

FOREIGN PATENT DOCUMENTS

| KR | 2017-0034591 A | 3/2017 |
|----|----------------|--------|
| KR | 10-1734769 B1  | 5/2017 |

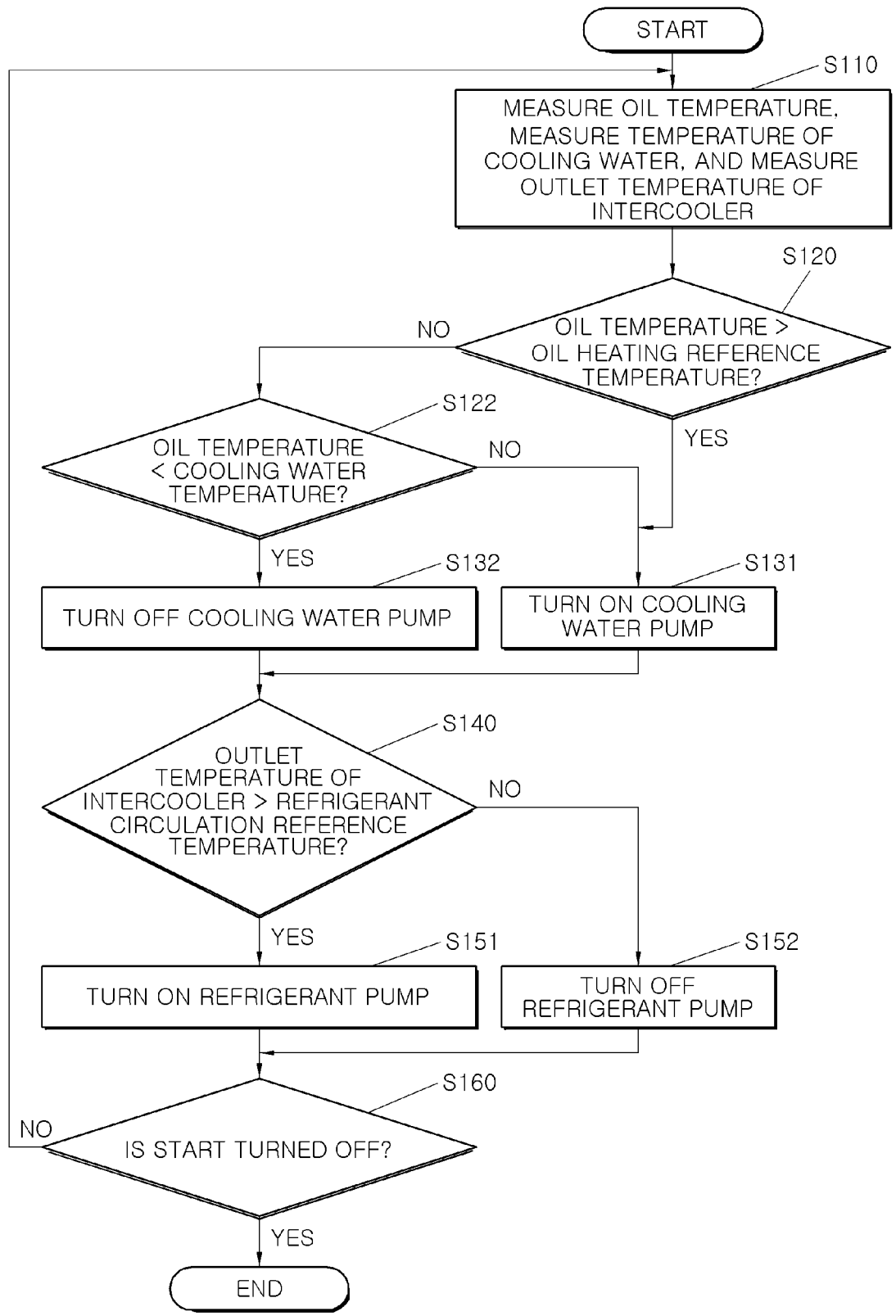

INTERCOOLER COOLING APPARATUS AND METHOD FOR CONTROLLING TRANSMISSION FLUID AND AIR CONDITIONER REFRIGERANT TEMPERATURE

CROSS-REFERENCE TO RELATED APPLICATIONS

This application claims priority to Korean Patent Application No. 10-2017-0115937, filed on Sep. 11, 2017, which is incorporated herein by reference in its entirety.

BACKGROUND

Field of the Invention

The present invention relates to an intercooler cooling apparatus for controlling an oil temperature and a method for controlling of the same capable of adjusting an oil temperature to improve cooling performance of an intercooler while performing rapid warm-up in initial starting.

Description of Related Art

A turbocharger 130 of a vehicle illustrated in FIG. 1 of the related art is a system that includes a turbine 132 rotated by exhaust gas to compress air flowing into an engine 110 using rotational force of the exhaust gas discharged from the engine 110 and a compressor 131 rotated by the turbine 132 and compressing the air flowing into the engine 110. The turbocharger 130 increases intake charge efficiency of the engine 110 and increases average effective pressure to increase an output.

A temperature of the air compressed by the compressor 131 increases and when the compressed air flows into the engine while the temperature of the air increases, torque and fuel efficiency of the engine 110 deteriorate. Generally, as the temperature of the air flowing into the engine increases, the torque and the fuel efficiency of the engine 110 tend to deteriorate. Accordingly, an intercooler 140 configured to cool the air heated by the compressor 131 is installed between the compressor 131 and the engine 110 to reduce the temperature of the air flowing into the engine 110, thereby increasing charging efficiency. The intercooler 140 is classified into a water-cooled type and an air-cooled type according to a cooling method.

Meanwhile, at an initial stage of starting of the engine 110, the viscosity of the oil filled in a transmission 120 is high, so that frictional resistance of the transmission 120 increases, which is one of factors that degrade the fuel efficiency. Accordingly, an automatic transmission fluid warmer 150, which circulates cooling water of the engine 110, is installed to heat the oil of the transmission 120. In other words, when the cooling water of the engine 110 passes the oil of the transmission 120 through the ATF warmer 150, the cooling water of the engine 110 that has been heated increases the temperature of the oil, and as a result, it is possible to perform fast warm-up to rapidly warm up the engine 110 at the initial stage of the start of the engine 110. However, since the temperature of the cooling water is insufficient at the initial stage of the start of the engine 110, the oil of the transmission 120 is unable to be rapidly heated.

SUMMARY

An exemplary embodiment of the present invention is directed to an intercooler cooling apparatus and a method for controlling of the same capable of adjusting an oil temperature to enhance cooling performance of an intercooler by cooling the intercooler cooling air flowing into an engine using a plurality of fluids based on a temperature condition. Another exemplary embodiment of the present invention is directed to an intercooler cooling apparatus and a method for controlling of the same capable of adjusting an oil temperature to use waste heat of the intercooler for heating oil of a transmission.

In accordance with an exemplary embodiment of the present invention, an intercooler cooling apparatus configured to cool an intercooler installed between a compressor of a turbocharger and an engine, which is capable of adjusting an oil temperature may include: a water tank that surrounds a part of an outer side of the intercooler, in which cooling water discharged from the engine flows into a first side to exchange heat with the intercooler and the cooling water may be discharged through a second side; and an automatic transmission fluid (ATF) warmer installed in the water tank, in which oil of a transmission may be circulated.

Some of the cooling water discharged from a radiator cooling the cooling water discharged from the engine may flow into the water tank and the cooling water discharged from the water tank may flow into the radiator. An auxiliary cooling line may be installed to circulate the cooling water in the radiator and the water tank, and a cooling water pump configured to circulate the cooling water may be installed in the auxiliary cooling line.

When the engine operates and the cooling water pump does not operate, air passing through the intercooler may heat the cooling water filled in the water tank and the cooling water filled in the water tank may heat transmission oil filled in the ATF warmer. The intercooler cooling apparatus may further include a fluid tank that surrounds a part of an outer side of the intercooler and charged with a heat-exchange fluid therein, in which refrigerant of an air conditioner passes through the first side to exchange heat with the intercooler.

The refrigerant discharged from a receiver dryer configured to store the refrigerant may pass through the fluid tank and thereafter, flow into the receiver dryer again. A refrigerant line may be disposed to allow the refrigerant to pass through the fluid tank from the receiver dryer and circulate to the receiver dryer again, and a refrigerant pump configured to circulate the refrigerant may be installed in the refrigerant line. The fluid tank may be disposed spaced apart from the water tank in the intercooler and cooled by the air flowing into an engine room in which the engine is installed at a portion where the water tank and the fluid tank are spaced apart from each other in the intercooler.

A heat exchange fluid filled in the fluid tank may be the cooling water or the oil, and the refrigerant of the refrigerant line passing through the fluid tank may exchange heat with the air passing through the intercooler through the heat exchange fluid. The water tank may be installed adjacent to an inlet of the intercooler and the fluid tank may be installed adjacent to an outlet of the intercooler. The water tank and the fluid tank may be disposed spaced apart from each other in a flow direction of the air passing through the intercooler.

Meanwhile, in accordance with another exemplary embodiment of the present invention, a method for controlling an intercooler cooling apparatus capable of adjusting an oil temperature, which includes a water tank that surrounds a part of an outer side of the intercooler, in which cooling water discharged from the engine flows into a first side to exchange heat with the intercooler and the cooling water is discharged through a second side, a fluid tank in which a heat exchange fluid filled in the fluid tank exchanges heat with air flowing through the intercooler while refrigerant of an air conditioner passes through the fluid tank at a location spaced apart from the water tank in the intercooler, and an ATF warmer installed in the water tank, in which oil of a transmission is circulated, may include: measuring an oil temperature of the transmission, the temperature of the cooling water, and an outlet temperature of the intercooler; comparing whether the temperature of the oil of the transmission is greater than a preset oil heating reference temperature by which the transmission oil needs to be heated; operating a cooling water pump when the temperature of the oil of the transmission is greater than the oil heating reference temperature; an intercooler outlet temperature comparison step of comparing whether the outlet temperature of the intercooler is greater than a preset refrigerant circulation reference temperature by circulating the refrigerant of the air conditioner; and operating a refrigerant pump when the outlet temperature of the intercooler is greater than the refrigerant circulation reference temperature.

When the temperature of the oil of the transmission is less than the oil heating reference temperature, the temperature of the oil of the transmission may be compared again with the temperature of the cooling water flowing into the water tank. In particular, when the temperature of the oil of the transmission is less than the temperature of the cooling water flowing into the water tank, the method may include preventing the cooling water pump from operating, and after the cooling water pump stopping process, the intercooler outlet temperature comparison may be performed.

In addition, the air passing through the intercooler may heat the cooling water filled in the water tank and the cooling water filled in the water tank may heat the transmission oil filled in the ATF warmer when the cooling water pump is prevented from being operated. When the temperature of the oil of the transmission is greater than the temperature of the cooling water flowing into the water tank, the cooling water pump operation may be performed. Thereafter, the method may include determining whether an engine of a vehicle is turned off, and when the engine is not turned off, the process may return to the temperature measurement.

Further, when the outlet temperature of the intercooler is less than the refrigerant circulation reference temperature, the method may include preventing the refrigerant pump from operating. After the refrigerant pump is prevented from being operated, whether the engine of the vehicle is turned off may be determined, and when the engine of the vehicle is not turned off, the process may return to the temperature measurement.

According to an intercooler cooling apparatus and a method for controlling of the same capable of adjusting an oil temperature in accordance with the present invention configured as such, waste heat of an intercooler may be used for heating oil of a transmission to enable rapid warm-up at an initial stage of starting, thereby enhancing fuel efficiency. In addition, by cooling the intercooler with different types of fluids, cooling efficiency of air in the intercooler may be increased. An outlet temperature of the intercooler may also be maintained substantially constant. As a result, power performance and the fuel efficiency of a vehicle may be enhanced and emission of carbon dioxide may be reduced.

Moreover, according to the present invention, both an intake air temperature of the intercooler and the waste heat generated through heat-exchange of superheated air with the intercooler may be used for heating the oil of the transmission in a vehicle to which a turbocharger is applied, thereby achieving an effect of reducing the intake air temperature and an effect of improving the fuel efficiency.

BRIEF DESCRIPTION OF THE DRAWINGS

The above and other objects, features and other advantages of the present invention will be more clearly understood from the following detailed description when taken in conjunction with the accompanying drawings, in which:

FIG. 4 is a flowchart illustrating a method for controlling an intercooler cooling apparatus capable of adjusting an oil temperature according to an exemplary embodiment of the present invention.

DETAILED DESCRIPTION

Figure 1:
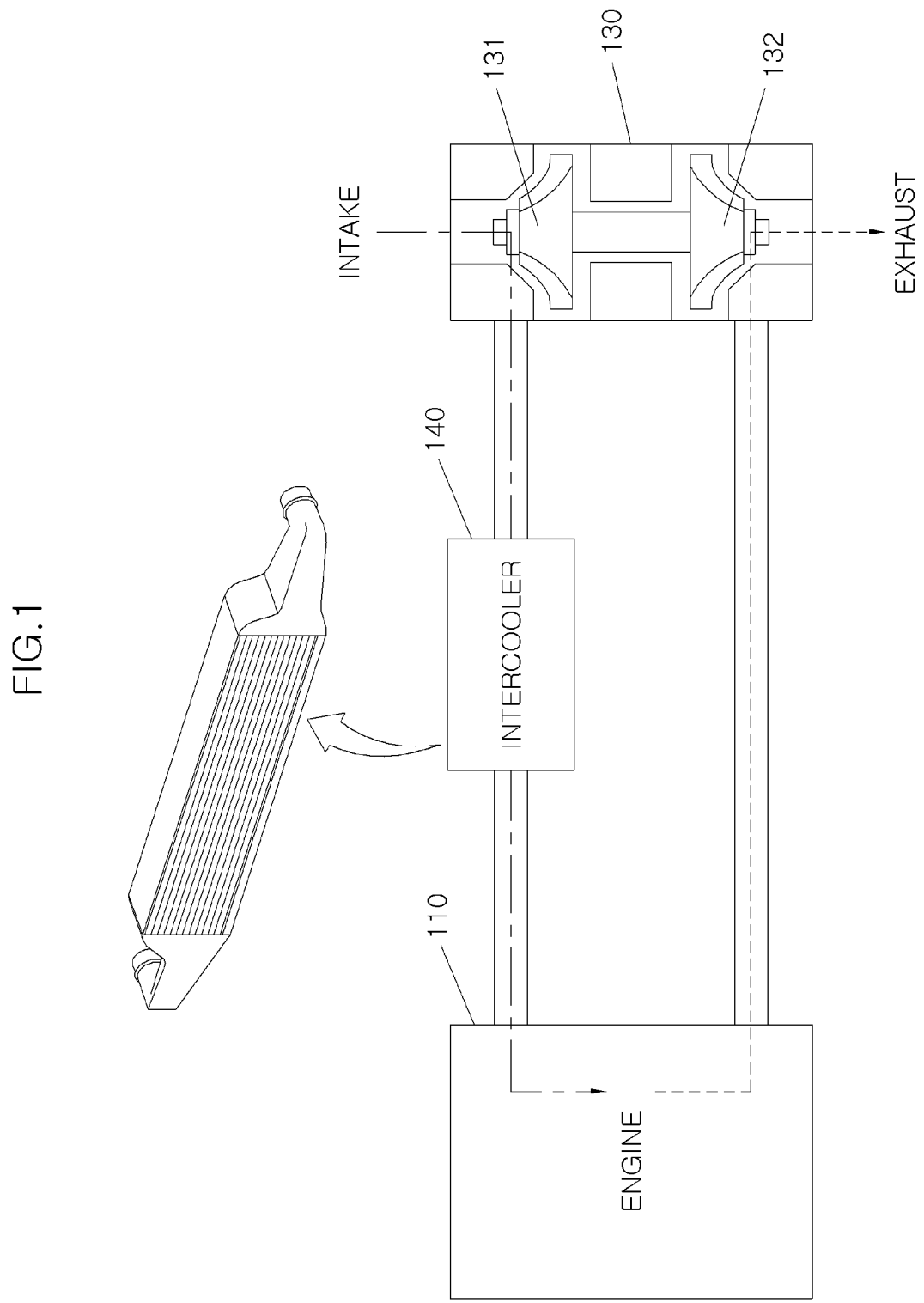
FIG. 1 is a schematic view illustrating a turbocharger system in the related art.
Figure 2:
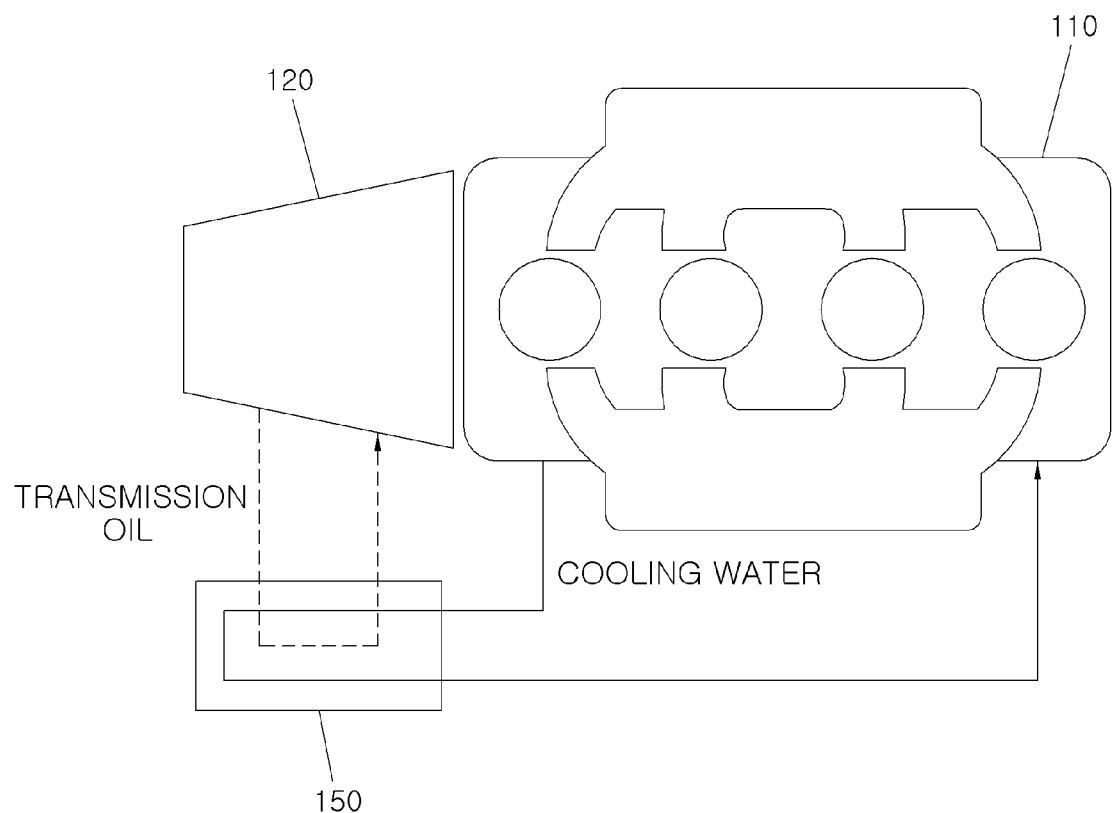
FIG. 2 is a schematic view illustrating an ATF warmer in the related art.
Figure 3:
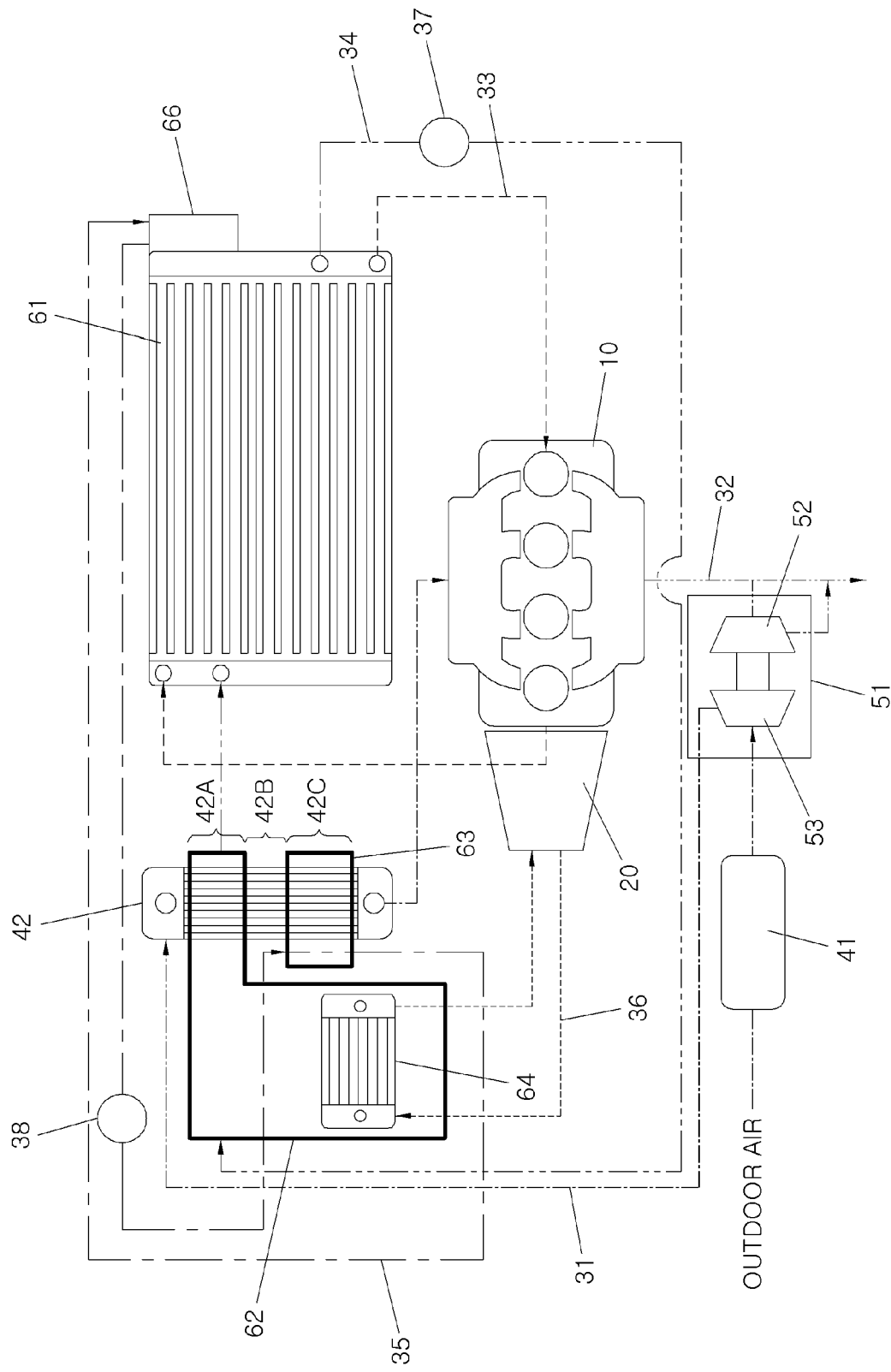
FIG. 3 is a block diagram illustrating an intercooler cooling apparatus capable of controlling an oil temperature according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an intercooler cooling apparatus capable of controlling an oil temperature and a method for controlling of the same according to the present invention will be described in detail with reference to the accompanying drawings.

The intercooler cooling apparatus capable of adjusting the oil temperature according to the present invention may include a water tank 62 that surrounds a part of an outer side of an intercooler 42, in which cooling water discharged from an engine 10 flows into a first side to exchange heat with the intercooler 42 and the cooling water is discharged through a second side, and an ATF warmer 64 installed in the water tank 62, in which oil of a transmission 20 is circulated.

The engine 10 combusts both outdoor air and fuel introduced through an intake line 31 to generate power and discharges combustion exhaust gas through an exhaust line 32 to the outside. A turbocharger 51 may be installed, which may include a turbine 52 rotated by the exhaust gas to increase an output of the engine 10 by increasing charging efficiency and average effective pressure of the air introduced into the engine and a compressor 53 rotated by the turbine 52 and configured to compress the air suctioned into the engine 10. Meanwhile, an intercooler 42 configured to cool the air heated by the compression of the air may be installed between the compressor 53 and the engine 10. The intake line 31 may be disposed with an air cleaner 41 to filter foreign substances contained in the air flowing into the engine 10.

The engine 10 may include a cooling circuit to maintain the engine 10 at an appropriate temperature. The engine 10 may be connected to a radiator 61 via a main cooling line 33 and the cooling water may circulate between the engine 10 and the radiator 61. The cooling water heated by the engine 10 may be supplied to the radiator 61 and cooled by the radiator 61 and then introduced into the engine 10 again. The main cooling line 33 may include a thermostat (not illustrated) configured to open the main cooling line 33 based on the temperature of the cooling water and a water pump (not illustrated) configured to circulate the cooling water.

A transmission 20 configured to shift driving force output from the engine 10 may be installed on a first side of the engine 10 and the transmission 20 may be connected to the ATF warmer 64 to rapidly increase the temperature of the oil filled in the transmission 20 or to maintain a proper temperature. In addition, an engine room of the vehicle may include an air conditioner configured to cool an interior of the vehicle and a receiver dryer 66 configured to store refrigerant required to drive the air conditioner may be installed at a first side of the engine room.

The intercooler 42 may be formed in a cylindrical shape, and heat radiating fins for heat exchange may be disposed outside the intercooler 42. In particular, the intercooler 42 has a structure for exchanging heat with one fluid, however, in the present invention, the intercooler 42 may be configured to exchange heat with various types fluids to cool the air flowing through the intercooler 42. The fluid that may be used for cooling the intercooler 42 may be the cooling water of the engine 10, driving wind flowing into the engine room, and the refrigerant of the air conditioner.

Accordingly, the intercooler 42 may be partitioned into a first heat exchange unit 42A for exchanging heat with the cooling water of the engine 10 in a direction in which the compressed air flows, a second heat exchange unit 42B for exchanging heat with the driving wind flowing into the engine room, and a third heat exchange unit 42C for exchanging heat with the refrigerant of the air conditioner. The first heat exchange unit 42A may surround the water tank 62 on the outer side of the first heat exchange unit 42A to exchange heat with the cooling water of the engine 10. The cooling water may flow into a first side of the water tank 62 and the cooling water may be discharged through a second side.

The water tank 62 may surround a part of the intercooler 42 and thus, the heat radiating fins of the intercooler 42 may also be disposed inside the water tank 62. In the water tank 62, the cooling water and the compressed air passing through the intercooler 42 may exchange heat with each other. A separate auxiliary cooling line 34 may be disposed between the radiator 61 and the water tank 62 to supply the cooling water to the water tank 62. The auxiliary cooling line 34 may connect the radiator 61 and the water tank 62 and thus, the cooling water may circulate in the radiator 61 and the water tank 62.

The auxiliary cooling line 34 may allow the cooling water to be supplied from a low temperature side to the water tank 62 in the radiator 61 and the cooling water to be discharged from the water tank 62 may flow into a high temperature side of the radiator 61. The auxiliary cooling line 34 may include a cooling water pump 37 configured to supply the cooling water from the radiator 61 to the water tank 62. The cooling water pump 37 installed in the auxiliary cooling line 34 may operate separately from the water pump installed in the main cooling line 33.

In the water tank 62, heat may be transferred from the air flowing through the intercooler 42 to the cooling water to decrease the temperature of the air passing through the intercooler 42 and to increase the temperature of the cooling water filled in the water tank 62. The water tank 62 may include the ATF warmer 64 configured to increase the temperature of the oil in the transmission 20 or maintain the oil at the appropriate temperature. The ATF warmer 64 may be connected to the transmission 20 via an oil line 36 to rapidly increase the oil temperature of the transmission 20 or maintain the oil temperature of the transmission 20 at the appropriate temperature.

For example, at the initial stage of the starting, when the temperature of the cooling water filled in the water tank 62 is greater than the temperature of the oil in the transmission 20, the oil of the transmission 20 may be rapidly heated and the viscosity may be reduced. Further, during driving, when the temperature of the oil in the transmission 20 is greater than the temperature of the cooling water filled in the water tank 62, the oil of the transmission 20 may be cooled to maintain the appropriate temperature.

The second heat exchange unit 42B is a part where the intercooler 42 is exposed to the air, and the heat radiating fins may be configured to exchange heat with the air flowing into the engine room. The third heat exchange unit 42C may be configured to exchange the air passing through the intercooler 42 with the refrigerant of the air conditioner. Accordingly, a fluid tank 63 that surrounds the first side of the intercooler 42 may be installed, a fluid for heat exchange may be filled in the fluid tank 63, and the refrigerant may flow while passing through the fluid tank 63. The fluid tank 63 may surround a part of the intercooler 42 and thus, the heat radiating fins of the intercooler 42 may also be disposed inside the fluid tank 63. In the water tank 62, the refrigerant and the compressed air passing through the intercooler 42 may exchange heat with each other.

However, in the fluid tank 63, the refrigerant and the air flowing through the intercooler 42 do not directly exchange heat with each other. The fluid tank 63 may be filled with a heat exchange fluid, such as antifreeze, cooling water, oil, which may flow for heat exchange. Since the refrigerant exchanges heat with the heat exchange fluid and the heat exchange fluid exchanges heat with the air of the intercooler 42, the refrigerant may indirectly exchange heat with the heat exchange fluid.

Since the refrigerant is generally stored in the receiver dryer 66 in the engine room, a refrigerant line 35 through which the refrigerant circulates may be connected to the receiver dryer 66 and the fluid tank 63. A refrigerant pump 38 configured to circulate the refrigerant may be installed at the first side of the refrigerant line 35. Since the first heat exchange unit 42A, the second heat exchange unit 42B, and the third heat exchange unit 42C may be formed in the direction of the air flowing through the intercooler 42, the water tank 62 may be installed adjacent to an inlet of the intercooler 42 and the fluid tank 63 may be installed adjacent to an outlet of the intercooler 42.

The first heat exchange unit 42A, the second heat exchange unit 42B, and the third heat exchange unit 42C may be disposed in order and the first heat exchange unit 42A, the second heat exchange unit 42B, and the third heat exchange unit 42C may be configured to exchange heat with the cooling water, the driving wind, and the refrigerant, respectively. Such a layout aims at allowing the air flowing through the intercooler 42 to exchange heat with the cooling water having a highest temperature among the cooling water, the driving wind, and the refrigerant, exchange heat with the driving wind having a second highest temperature, and thereafter, last exchange heat with the refrigerant having a lowest temperature.

Particularly, a length of the first heat exchange unit 42A may be set as a length in which the temperature of the supercharging air passing through the first heat exchange unit in the intercooler 42 shows the maximum cooling performance per vehicle speed to minimize the length of the first heat exchange unit 42A. For example, when the intercooler 42 is about 300 mm, the length of the first heat exchange unit 42A may be about 60 mm corresponding to about 20%.

Additionally, a plurality of temperature sensors (not illustrated) configured to measure the temperature of the air discharged from the intercooler 42, the temperature of the cooling water discharged from the radiator 61, the temperature of the oil of the transmission 20, the temperature in the water tank 62, and the temperature in the fluid tank 63 may be installed in the outlet of the intercooler 42, the outlet of the radiator 61, the ATF warmer, the water tank 62, and the fluid tank 63, respectively. The values measured by the temperature sensors may be output to a controller, for example, an electronic control unit (ECU) of the vehicle. The ECU may be configured to compare the measured value from each of the temperature sensors with a predetermined value to operate the cooling water pump 37 and the refrigerant pump 38.

Meanwhile, a control method of the intercooler cooling apparatus capable of adjusting the oil temperature according to the present invention as illustrated in FIG. 4 will be described below. The control method of the intercooler cooling apparatus capable of adjusting the oil temperature according to the present invention may be performed using the intercooler cooling apparatus capable of adjusting the oil temperature as described above. The method described herein below may be executed by an overall controller.

The control method of the intercooler cooling apparatus capable of controlling the oil temperature according to the present invention may include measuring the oil temperature of the transmission 20, the temperature of the cooling water, and the outlet temperature of the intercooler 42 (S110), comparing whether the temperature of the oil of the transmission is greater than a preset oil heating reference temperature by which the transmission oil needs to be heated (S120), operating the cooling water pump 37 when the temperature of the oil in the transmission 20 is greater than the oil heating reference temperature (S131), comparing whether the outlet temperature of the intercooler 42 is greater than a preset refrigerant circulation reference temperature by circulating the refrigerant of the air conditioner (S140), and operating the refrigerant pump 38 when the outlet temperature of the intercooler 42 is greater than the refrigerant circulation reference temperature (S151).

The control method of the intercooler cooling apparatus capable of controlling the oil temperature according to the present invention may be performed by the ECU installed in the vehicle. In other words, the ECU may be configured to operate the cooling water pump 37 and the refrigerant pump 38 while the engine 10 is operated according to logic and conditions stored in advance in the ECU with respect to the value measured by each sensor to allow the logic to be performed. When the engine 10 is started, a value specified from each of the temperature sensors may be input to the ECU, and the ECU may be configured to measure the temperature of the oil of the transmission 20, the temperature of the cooling water, and the outlet temperature of the intercooler 42. In particular, the temperature of the cooling water is the temperature of the cooling water discharged from the radiator 61.

In addition, a comparison of whether a current temperature of the oil in the transmission 20 is greater than an oil heating reference temperature may be performed and the reference temperature may be a preset temperature by heating the oil of the transmission 20. The oil heating reference temperature becomes a temperature at which the viscosity of the oil of the transmission 20 becomes a predetermined viscosity or less. In other words, the oil heating reference temperature may be a minimum/optimum temperature capable of improving the fuel efficiency by decreasing the oil viscosity. When the current temperature of the oil of the transmission 20 is greater than the oil heating reference temperature, the oil of the transmission 20 may not be heated, but when the current temperature of the oil of the transmission 20 is less than the oil heating reference temperature, the oil of the transmission 20 needs to be heated.

Therefore, whether the oil of the transmission 20 is heated may be determined by comparing and determining the oil temperature of the transmission 20 with the oil heating reference temperature. The second oil temperature comparison S122 may be performed when the oil temperature of the transmission 20 is less than the oil heating reference temperature in the first oil temperature comparison. In the second oil temperature comparison S122, the temperature of the oil of the transmission 20 may be compared with the temperature of the cooling water introduced into the water tank 62 and thus, whether the temperature of the oil of the transmission 20 is less than the temperature of the cooling water flowing into the water tank 62 may be determined.

The cooling water pump operation S131 may be performed when the temperature of the oil in the transmission 20 is greater than the oil heating reference temperature in the first oil temperature comparison S120 or the temperature of the oil in the transmission 20 is greater than the temperature of the cooling water flowing into the water tank 62 in the second oil temperature comparison S122. In the cooling water pump operation S131, the cooling water pump 37 may be operated to circulate the cooling water between the water tank 62 and the radiator 61 through the auxiliary cooling line 34.

The cooling water pump operation S131 may be performed in two cases. First, when the temperature of the oil in the transmission 20 is greater than the oil heating reference temperature in the first oil temperature comparison S120, the cooling water pump operation S131 may be performed and in particular, since the oil temperature of the transmission 20 is greater than the oil heating reference temperature, the cooling water pump 37 may be configured to operate to cause the cooling water to flow into the water tank 62. Since the oil temperature of the transmission 20 is greater than the oil heating reference temperature, the oil may maintain the viscosity low to prevent a decrease in fuel efficiency.

In addition, the cooling water pump operation S131 may be performed when the temperature of the oil in the transmission 20 is greater than the temperature of the cooling water flowing into the water tank 62 in the second oil temperature comparison S122, that is, when the temperature of the oil in the transmission 20 is greater than the temperature of the cooling water and since the oil temperature of the transmission 20 is greater than the temperature of the cooling water, the cooling water may be circulated to heat the oil of the transmission 20. The temperature of the oil of the transmission 20 may not reach the oil heating reference temperature, the oil of the transmission 20 may be heated more rapidly when the oil of the transmission receives thermal energy from the cooling water.

When the temperature of the oil of the transmission 20 is less than the temperature of the cooling water flowing into the water tank 62 in the second oil temperature comparison S122, the cooling water pump may be stopped S132. In particular, when the temperature of the oil of the transmission 20 is less than the temperature of the cooling water, the thermal energy is not transferred from the cooling water to the oil of the transmission 20 even when the cooling water flows into the water tank 62. Accordingly, when the temperature of the oil of the transmission 20 is less than the temperature of the cooling water flowing into the water tank 62 in the second oil temperature comparison S122, the cooling water pump 37 may be stopped to prevent the cooling water from being circulated.

The cooling water of the radiator 61 does not flow into the water tank 62 since the cooling water pump 37 is not operated in the cooling water pump stopping process S132. In particular, the cooling water in the water tank 62 may be heated by the air passing through the intercooler 42, which again supplies the thermal energy to the ATF warmer 64 to increase the temperature of the oil in the transmission 20. In other words, in the cooling water pump stopping process S132, the air passing through the intercooler 42 increases the temperature of the oil in the ATF warmer 64.

The intercooler outlet temperature comparison S140 may be performed after the cooling water pump operation S131 or after the cooling water pump stop S132. In the intercooler outlet temperature comparison S140, whether the outlet temperature of the intercooler 42 is greater than the preset refrigerant circulation reference temperature may be determined by circulating the refrigerant of the air conditioner. The refrigerant circulation reference temperature is the temperature of the outlet of the intercooler 42, which is a combustion chamber inlet temperature required by the engine 10.

When the outlet temperature of the intercooler 42 is greater than the refrigerant circulation reference temperature, the refrigerant pump 38 may be operated S151. Further, when the outlet temperature of the intercooler 42 is less than the refrigerant circulation reference temperature, the refrigerant pump 38 may be stopped (when the refrigerant pump is operating) or a stopped state may be maintained (when the refrigerant pump is stopped).

After the refrigerant pump is operated or after the refrigerant pump is stopped, an engine off determination may be performed S160. In other words, whether the engine of the vehicle is turned off may be determined and the logic may be terminated when the engine of the vehicle is turned off. However, when the engine of the vehicle is not turned off, the process may return to the temperature measurement S110.

What is claimed is:

1. An intercooler cooling apparatus cooling an intercooler installed between a compressor of a turbocharger and an engine, capable of adjusting an oil temperature, comprising:
   a water tank that surrounds a part of an outer side of the intercooler, in which cooling water discharged from the engine flows into a first side to exchange heat with the intercooler and the cooling water is discharged through a second side; and
   an automatic transmission fluid (ATF) warmer installed in the water tank, in which oil of a transmission is circulated.

2. The intercooler cooling apparatus of claim 1, wherein a portion of the cooling water discharged from a radiator cooling the cooling water discharged from the engine flows into the water tank and the cooling water discharged from the water tank flows into the radiator.

3. The intercooler cooling apparatus of claim 2, wherein an auxiliary cooling line is installed to circulate the cooling water in the radiator and the water tank, and a cooling water pump configured to circulate the cooling water is installed in the auxiliary cooling line.

4. The intercooler cooling apparatus of claim 3, wherein when the engine operates and the cooling water pump does not operate, air passing through the intercooler heats the cooling water filled in the water tank and the cooling water filled in the water tank heats transmission oil filled in the ATF warmer.

5. The intercooler cooling apparatus of claim 1, further comprising:
   a fluid tank that surrounds a part of an outer side of the intercooler and charged with a heat-exchange fluid therein, in which refrigerant of an air conditioner passes through the first side to exchange heat with the intercooler.

6. The intercooler cooling apparatus of claim 5, wherein the refrigerant discharged from a receiver dryer configured to store the refrigerant passes through the fluid tank and thereafter, flows into the receiver dryer again.

7. The intercooler cooling apparatus of claim 6, wherein a refrigerant line is provided to allow the refrigerant to pass through the fluid tank from the receiver dryer and circulate to the receiver dryer again, and a refrigerant pump configured to circulate the refrigerant is installed in the refrigerant line.

8. The intercooler cooling apparatus of claim 5, wherein the fluid tank is disposed spaced apart from the water tank in the intercooler and cooled by the air flowing into an engine room in which the engine is installed at a portion where the water tank and the fluid tank are spaced apart from each other in the intercooler.

9. The intercooler cooling apparatus of claim 5, wherein a heat exchange fluid filled in the fluid tank is the cooling water or the oil, and the refrigerant of the refrigerant line passing through the fluid tank exchange heat with the air passing through the intercooler through the heat exchange fluid.

10. The intercooler cooling apparatus of claim 5, wherein the water tank is installed adjacent to an inlet of the intercooler and the fluid tank is installed adjacent to an outlet of the intercooler.

11. The intercooler cooling apparatus of claim 10, wherein the water tank and the fluid tank are disposed spaced apart from each other in a flow direction of the air passing through the intercooler.

12. A method for controlling an intercooler cooling apparatus capable of controlling an oil temperature, which includes a water tank that surrounds a part of an outer side of the intercooler, in which cooling water discharged from the engine flows into a first side to exchange heat with the intercooler and the cooling water is discharged through a second side, a fluid tank in which a heat exchange fluid filled in the fluid tank exchanges heat with air flowing through the intercooler while refrigerant of an air conditioner passes through the fluid tank at a location spaced apart from the water tank in the intercooler, and an automatic transmission fluid (ATF) warmer installed in the water tank, in which oil of a transmission is circulated, the method comprising:
 measuring, by a plurality of sensors, an oil temperature of the transmission, a temperature of the cooling water, and an outlet temperature of the intercooler;
 comparing, by the controller, whether the temperature of the oil of the transmission is greater than a preset oil heating reference temperature by which the transmission oil needs to be heated;
 operating, by the controller, a cooling water pump when the temperature of the oil of the transmission is greater than the oil heating reference temperature;
 comparing, by the controller, whether the outlet temperature of the intercooler is greater than a preset refrigerant circulation reference temperature by circulating the refrigerant of the air conditioner; and
 operating, by the controller, a refrigerant pump when the outlet temperature of the intercooler is greater than the refrigerant circulation reference temperature.

13. The method of claim 12, further comprising:
 when the temperature of the oil of the transmission is less than the oil heating reference temperature, comparing, by the controller, the temperature of the oil of the transmission with the temperature of the cooling water flowing into the water tank.

14. The method of claim 13, further comprising:
 when the temperature of the oil of the transmission is less than the temperature of the cooling water flowing into the water tank, preventing, by the controller, the cooling water pump from operating; and
 performing, by the controller, the intercooler outlet temperature comparison.

15. The method of claim 14, wherein the air passing through the intercooler heats the cooling water filled in the water tank and the cooling water filled in the water tank heats the transmission oil filled in the ATF warmer.

16. The method of claim 13, wherein when the temperature of the oil of the transmission is greater than the temperature of the cooling water flowing into the water tank, the cooling water pump is operated.

17. The method of claim 12, further comprising:
 determining, by the controller, whether an engine of a vehicle is turned off; and
 in response to determining that the engine of the vehicle is not turned off, measuring, by a controller, an oil temperature of the transmission, a temperature of the cooling water, and an outlet temperature of the intercooler t.

18. The method of claim 12, wherein when the outlet temperature of the intercooler is less than the refrigerant circulation reference temperature, the refrigerant pump is prevented from operating.

19. The method of claim 18, further comprising:
 determining, by the controller, whether the engine of the vehicle is turned off; and
 in response to determining that the engine of the vehicle is not turned off, measuring, by a controller, an oil temperature of the transmission, a temperature of the cooling water, and an outlet temperature of the intercooler.

\* \* \* \* \*